(12) United States Patent
Dravet et al.

(10) Patent No.: US 7,520,369 B2
(45) Date of Patent: Apr. 21, 2009

(54) SOUNDPROOFING PANEL WITH BEADS, AND A METHOD OF MANUFACTURE

(75) Inventors: Alain Dravet, Chevilly la Rue (FR); Georges Riou, Melun (FR); Jacques Julliard, Hericy sur Seine (FR); Osmin Delverdier, Saint Jean Lherm (FR); Philippe Vie, Toulouse (FR)

(73) Assignees: SNECMA, Paris (FR); ATECA, Montauban (FR)

( * ) Notice: Subject to any disclaimer, the term of this patent is extended or adjusted under 35 U.S.C. 154(b) by 73 days.

(21) Appl. No.: 10/991,543

(22) Filed: Nov. 19, 2004

(65) Prior Publication Data

US 2005/0109557 A1    May 26, 2005

(30) Foreign Application Priority Data

Nov. 21, 2003    (FR) .................................... 03 13640

(51) Int. Cl.
    *E04B 1/84*    (2006.01)
(52) U.S. Cl. ....................... 181/292; 181/284; 181/290; 181/293
(58) Field of Classification Search ................. 181/292, 181/288, 290, 293, 284, 286, 291
    See application file for complete search history.

(56) References Cited

U.S. PATENT DOCUMENTS 3,913,702 A * 10/1975 Wirt et al. .................... 181/286
4,667,768 A * 5/1987 Wirt ............................ 181/286
4,989,688 A * 2/1991 Nelson ......................... 181/287
5,594,216 A * 1/1997 Yasukawa et al. ............ 181/213
5,744,763 A * 4/1998 Iwasa et al. .................. 181/286
5,777,947 A * 7/1998 Ahuja ............................. 367/1
5,997,985 A * 12/1999 Clarke et al. ................. 428/116
6,085,865 A * 7/2000 Delverdier et al. .......... 181/292
6,179,086 B1 * 1/2001 Bansemir et al. ............ 181/292
6,209,679 B1 * 4/2001 Hogeboom et al. ......... 181/286
2002/0094412 A1 * 7/2002 Murray et al. ............... 428/116
2002/0166721 A1 * 11/2002 Monson et al. .............. 181/292

FOREIGN PATENT DOCUMENTS

| EP | 0 940 248 A1 | 9/1999 |
| FR | 2 660 787 | 10/1991 |
| FR | 2 778 780 | 11/1999 |
| JP | 62-268864 | 11/1987 |

OTHER PUBLICATIONS

Database WPI, Section Ch, Week 198801, Derwent Publications Ltd., London, GB; AN 1988-004140, XP002287332 & JP 62 268864 A (Matsuyama K), Nov. 21, 1987, p. 373.

* cited by examiner

*Primary Examiner*—Walter Benson
*Assistant Examiner*—Jeremy Luks
(74) *Attorney, Agent, or Firm*—Oblon, Spivak, McClelland, Maier & Neustadt, P.C.

(57) ABSTRACT

A soundproofing panel having a core sandwiched between a solid wall and a porous wall. The core being connected to the walls and having partitions extending in the thickness direction between the two walls so as to form cells. Each cell containing at least one sound energy dissipating layer constituted by hollow spherical beads having mutually contacting walls that are porous and micro-perforated, and being held in position in the thickness direction between the two walls by nets that are secured to the partitions.

18 Claims, 3 Drawing Sheets

SOUNDPROOFING PANEL WITH BEADS, AND A METHOD OF MANUFACTURE

BACKGROUND OF THE INVENTION

The present invention relates to the general field of soundproofing panels of the so-called "passive" type operating on the basis of Helmholtz resonators.

It finds an advantageous application in the aviation sector, in particular for the ducts of a turbomachine that are subjected to high temperatures.

In the field of aviation, soundproofing panels are used to reduce the level of sound emitted by the turbomachines of an airplane. These panels are generally disposed directly as flow walls in order to attenuate the sound energy generated by the various components of the turbomachine.

The present invention seeks more particularly to apply such soundproofing panels to the hot ducts of a turbomachine, for example at turbine outlets or at the exhaust nozzle.

In this context, it is therefore necessary to make soundproofing panels that withstand the high temperatures of the ducts and that enable sound levels to be reduced without thereby penalizing the strength, the weight, or the size of the turbomachine.

A known method of making soundproofing panels is described in patent FR 2 775 216. That document purposes making soundproofing panels by means of a structure sandwiched between two skins and having cells that are arranged as Helmholtz resonators. The Helmholtz resonators are implemented in the form of layers of hollow beads that are stuck to one another and to the walls of the structure by a resin type binder.

Apart from the difficulty in making it, the soundproofing panel described in that patent presents certain other drawbacks for applications at high temperature.

That soundproofing panel presents poor thermal behavior when it is subjected to high temperatures, and the use of a binder between the beads leads to problems of galvanic coupling, leading in turn to problems with points of corrosion.

In addition, when processing using cavities of large dimensions, the method disclosed is difficult to adapt to implementing soundproofing panels with acoustic characteristics that vary. For example, it is difficult to vary the thicknesses of the layers of beads within a given cell so that the acoustic characteristics of the cell remain substantially constant.

OBJECT AND SUMMARY OF THE INVENTION

The present invention thus seeks to mitigate such drawbacks by proposing a soundproofing panel that withstands high temperatures, that has improved acoustic performance, and that can present acoustic characteristics that vary.

The invention also seeks to provide a method of making such a soundproofing panel.

The soundproofing panel comprises a soundproofing panel comprising a core sandwiched between a solid wall and a porous wall, the core being connected to the walls and including partitions extending in the thickness direction between the two walls and forming cells, each cell containing at least one sound energy dissipating layer constituted by hollow spherical beads with porous walls in mutual contact.

According to the invention, the beads have walls that are micro-perforated and that are held in position in the thickness direction between the two walls by nets that are secured to the partitions.

The layers formed by hollow spherical beads having porous micro-perforated walls enables a large amount of sound energy to be dissipated by the viscothermal effect on the air. This can be understood by the fact that spaces remain between the beads in a given layer, which spaces constitute a multitude of air molecule passages between the two nets. These passages form an interstitial network which is at the origin of sound energy dissipation by friction between the moving air and the network (the viscothermal phenomenon).

The use of beads with walls that are porous and micro-perforated has the advantage of significantly increasing the viscothermal effect on the air compared with beads that are not micro-perforated. Micro-perforating the walls of the hollow beads enables the insides of the beads to participate in passing molecules of air in the same manner as the interstitial network.

The overall porosity of such a sound energy dissipating layer can thus be raised from about 40% to about 80%, compared with a layer of beads that are not micro-perforated.

As a result, the acoustic effectiveness of the panel of the invention is increased for given size compared with a conventional panel, and this gives rise to a sound-absorption band that is broader in terms of frequency. Likewise, for similar acoustic performance, the soundproofing panel of the invention can achieve space savings.

Use of metal nets for holding the beads in place instead of using a binder also presents numerous advantages. In particular, this makes it simpler to manufacture the soundproofing panel and makes it possible locally to vary its acoustic characteristics (varying the thickness of the layer within a given cell, mixing different types of spheres, . . . ), and to adapt those characteristics to requirements, e.g. on the basis of angular or radial sectors.

It is advantageous to use nets having the same compositions as the partitions to which they are secured, which can make it possible to avoid problems of heterogeneous coupling that lead to corrosion. It is also possible to obtain a one-piece soundproofing panel that is circularly symmetrical.

The sound energy dissipating layers of the soundproofing panel can be constituted by a mixture of beads of uniform diameter (ignoring manufacturing tolerance) or by a mixture of beads having diameters lying in the range 1 millimeter (mm) to 3.5 mm.

In addition, the sound energy dissipating layers may be of thickness that is constant or that varies within a given cell. As explained above, these advantageous characteristics make it possible to cause the acoustic characteristics of the soundproofing panel to vary.

The method of making a soundproofing panel of the invention comprises the following steps:
  making a core comprising partitions that form cells;
  for each cell of said core, positioning a lower net and securing it to said partitions, placing on said lower net a desired thickness of hollow spherical beads having porous and micro-perforated walls, positioning an upper net while applying a small amount of pressure against said beads, and securing said upper net to said partitions;
  applying and securing one of the faces of said core to a porous wall; and
  applying and securing the other face of said core to a solid wall.

BRIEF DESCRIPTION OF THE DRAWINGS

Other characteristics and advantages of the present invention appear from the following description given with reference to the accompanying drawings which show an embodiment having no limiting character. In the figures.

DETAILED DESCRIPTION OF AN EMBODIMENT

Figure 1:
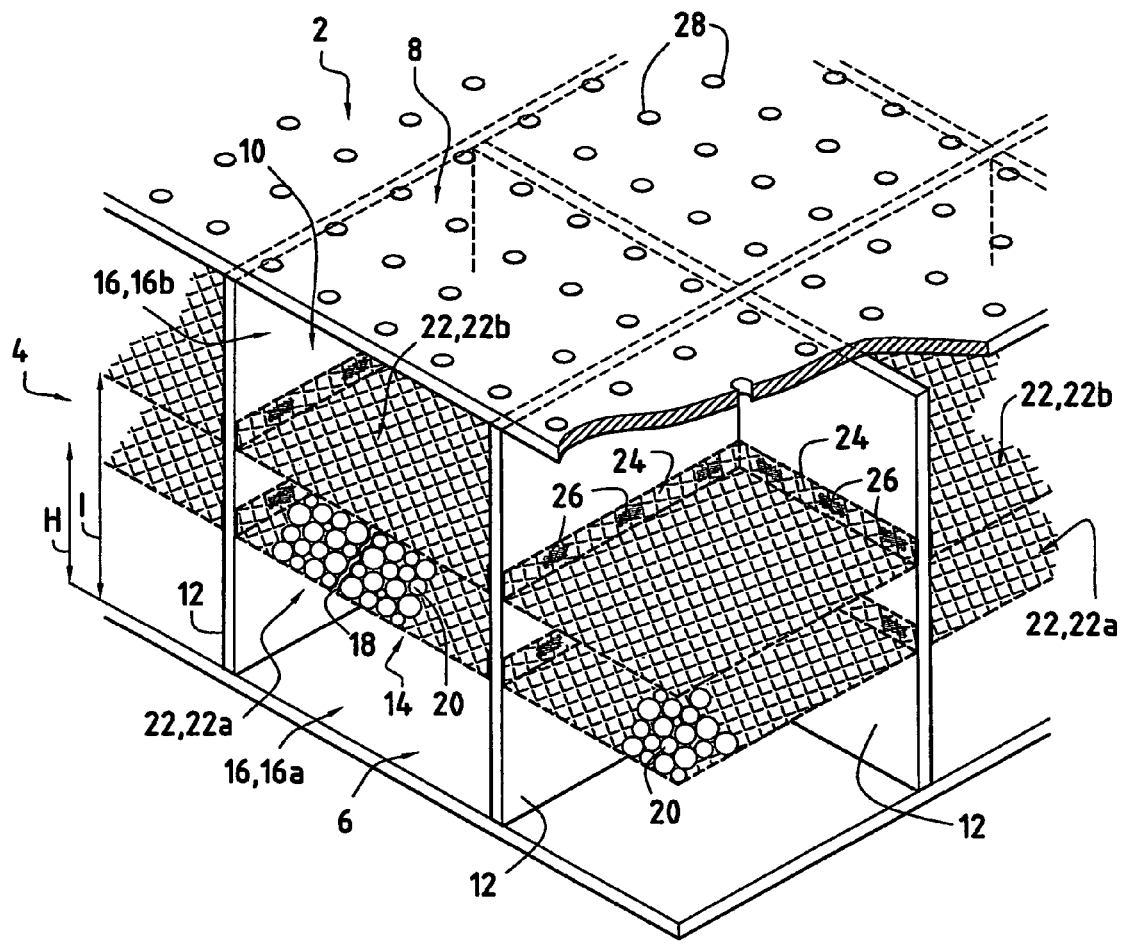
FIG. 1 is a fragmentary perspective view of a soundproofing panel constituting an embodiment of the invention.

Reference is made initially to FIG. 1 which is a perspective view of a soundproofing panel in an embodiment of the invention.

The soundproofing panel 2 is a structure comprising a core 4 sandwiched between a solid wall (or skin) 6 and a porous wall (or skin) 8. The core 4 of the panel is constituted by a plurality of cells 10 that are separated by partitions 12 extending in the thickness direction of the core, perpendicularly to the walls 6 and 8.

The cells may be of rectangular section (as shown in FIG. 1), or they may be of triangular or hexagonal section, for example.

The partitions 12 are fixed to the walls 6 and 8, e.g. by welding, so as to form the structure of the soundproofing panel and so as to ensure that it is rigid and strong.

Each cell 10 formed in this way is subdivided in the thickness direction of the core 4 by at least one sound energy dissipating layer 14 whose edges are secured to the partitions 12.

The dissipating layers 14 subdivide each cell into at least two cavities 16. In FIG. 1, there is only one dissipating layer 14 shown per cell, with the bottom cavity being referenced 16a, i.e. the cavity against the solid wall 6, and with the inlet cavity being referenced 16b, i.e. the cavity against the porous wall 8. The dissipating layer 14 is pierced right through by a plurality of passages 18 putting the cavities 16a and 16b into communication with each other and forming an interstitial network.

The inlet cavity 16b is in communication with the outside of the soundproofing panel via the porous wall 8. As a result, sound energy coming from outside the soundproofing panel 2 passes through the porous wall 8 and puts into resonance the cavities 16 that are coupled together by the passages 18 formed through the dissipating layers 14.

Sound energy is thus dissipated mainly by the viscothermal effect of air passing through the dissipating layers, and to a smaller extent through the porous wall 8.

In the invention, each sound energy dissipating layer 14 is constituted by hollow spherical beads 20 having walls that are porous and micro-perforated.

Within the dissipating layers, the beads 20 are in mutual contact and they are held in position in the thickness direction between the walls 6 and 8 by rigid nets or trellises 22 that are secured to the partitions 12.

These nets 22, e.g. made of metal, serve to position and hold the spherical beads 20 inside the dissipating layer 14. They thus present mesh voids that are relatively small compared with the diameter of the beads (for example of the order of 0.2 mm for beads having a diameter lying in the range 1 mm to 3.5 mm). No binder is therefore required to keep the beads in mutual contact.

The nets 22 have their edges 24 secured to the partitions 12 by welding, brazing, riveting, or any other equivalent technique. In FIG. 1, spot welds 26 are shown diagrammatically.

In order to avoid the beads 20 moving inside the dissipating layer, the nets 22 are assembled so as to be under a small amount of pressure (about 0.1 mbar to 0.2 mbar). Although no significant displacement of the beads is allowed, they nevertheless retain freedom of "micro-displacement" enabling the vibrations to which the soundproofing panel is subjected to be damped.

The nets 22 preferably have the same composition as the partitions 12 to which they are secured so as to avoid problems of heterogeneous coupling which can lead to corrosion. For example, both the nets 22 and the partitions 12 should be made of the same metal based on nickel or on stainless steel.

According to an advantageous characteristic of the invention, the porous wall 8 presents perforations 28 so as to optimize the viscothermal effect on the air passing through it.

By way of example, these perforations 28 may be circular orifices of a diameter lying in the range 0.5 mm to 2 mm, and the perforation ratio of the porous wall 8 may lie in the range 10% to 30%.

In FIG. 1, only one dissipating layer 14 is shown per cell 10. It is also possible for each cell to have a plurality of dissipating layers across the thickness of the core 4, depending on the acoustic characteristics that are required for the soundproofing panel.

Figure 2A:
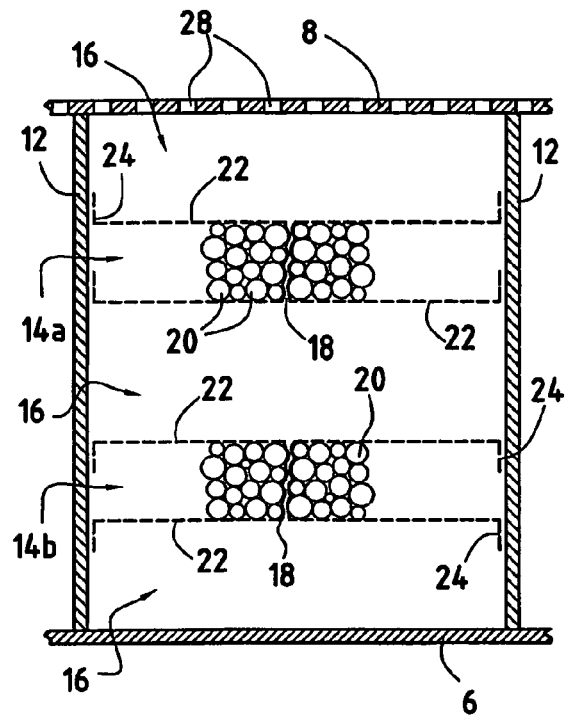
FIGS. 2A and 2B are section views across the thickness of soundproofing panels in two other variants of the invention.

Thus, the soundproofing panel shown in FIG. 2A has two sound energy dissipating layers 14a and 14b arranged with a single cell 10.

Likewise, still for the purpose of causing the acoustic characteristics of the soundproofing panel to vary, the dissipating layers 14 may be constituted by mixtures of beads 20 having diameters that are uniform, or diameters that are different.

According to another advantageous characteristic of the invention, the acoustic characteristics of the soundproofing panel can also be caused to vary by varying the thickness of the dissipating layers 14 within a single cell 10. This can be done by varying the spacing between the nets 22.

In addition, the shaping of the dissipating layers 14 makes it possible advantageously to form circularly symmetrical soundproofing panels as single pieces.

Figure 2B:
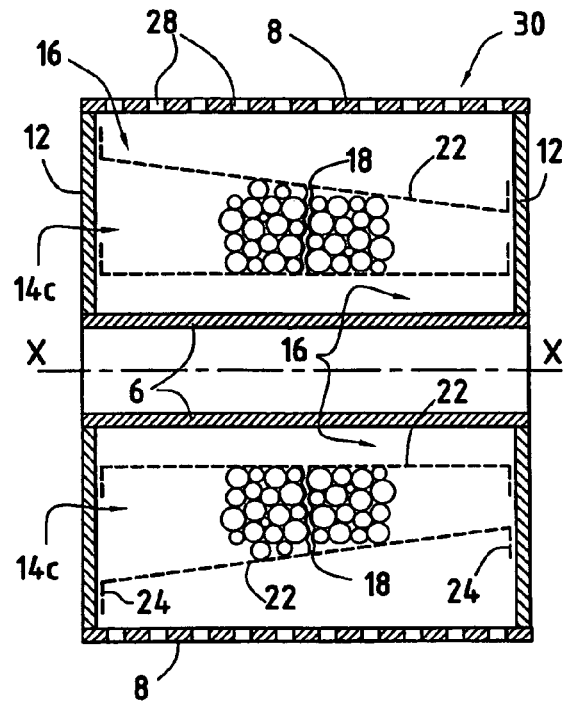

FIG. 2B shows both of these advantages clearly. The soundproofing panel shown in section in this figure is a circularly symmetrical part 30 about an axis X-X and it is made as a single piece, presenting a dissipating layer 14c that is of thickness that varies along the axis X-X.

The nature of the beads 20 making up the sound energy dissipating layers 14 is described below.

Each dissipating layer 14 presents acoustic impedance which is directly related to the acoustic characteristics of the layer. This impedance depends in particular on the type of beads used and on how they are assembled together.

The beads 20 of the dissipating layers 14 are substantially spherical and hollow, and they have porous walls. Their outside diameter preferably lies in the range 0.5 mm to 5 mm, with a wall thickness of about 0.3 mm.

The beads are advantageously made of ceramic (of the alumina type) but they could also be made of metal (sintered powder) or of zirconia.

In the invention, the beads 20 of the dissipating layers 14 which are substantially spherical, hollow, and with walls that are porous, are also micro-perforated.

Micro-perforation is a kind of porosity that is additional to the intrinsic porosity of the walls of the beads. It is achieved by piercing at least two holes passing right through the walls of the beads, and it is characterized by dimensions that are expressed in several hundreds of microns (of the order of 200 μm to 400 μm), in comparison with the pores whose dimensions are typically expressed in tens of microns (about 10 μm).

Thus, the dimensions of the micro-perforations formed in the walls of the beads 20 are greater than the dimensions of the pores in the same walls by a factor of at least about 20.

The shape and the dimensions of the micro-perforations vary depending on the method used for making them. Thus, they may be substantially cylindrical (e.g. having a diameter of about 20 μm), or they may be of rectangular section (e.g. having a width of about 200 μm and a length of about 500 μm).

Having micro-perforations in the walls of the beads 20 significantly improves the sound-absorption capacities of the dissipating layers 14. Such micro-perforations enable the insides of the hollow beads to participate in passing molecules of air, in the same manner as the interstitial network formed between the beads.

The table below and the absorption coefficient plot (FIG. 3) show this improvement compared with beads that are not micro-perforated.

Tests have been performed with a layer of constant thickness equal to 10 mm and made up of a bulk assembly of beads having a common diameter of 1.5 mm (ignoring manufacturing tolerances). The results were as follows:

| Characteristics | Resistance to flow (in Pa · s) | Tortuosity | Porosity (in %) |
|---|---|---|---|
| Non-micro-perforated beads | 13,600 | 3.36 | 40 |
| Micro-perforated beads | 15,800 | 3.91 | 80 |

The flow resistance, which is expressed as the ratio between head loss and air flow speed through the dissipating layer, represents acoustic resistance. This acoustic resistance depends on the porosity and on the tortuosity, and its value should be optimized in order to obtain a maximum amount of sound dissipation.

The porosity in the zone occupied by the beads represents the ratio between the open volume to the total volume of the dissipating layer. Like tortuosity, porosity must therefore be as great as possible in order to make maximum use of the volume available for dissipating sound energy, thus making it possible to determine frequency settings.

Nevertheless, it must be ensured that the damping represented by the acoustic resistance remains sufficient to enable sound energy to be dissipated.

Figure 3:
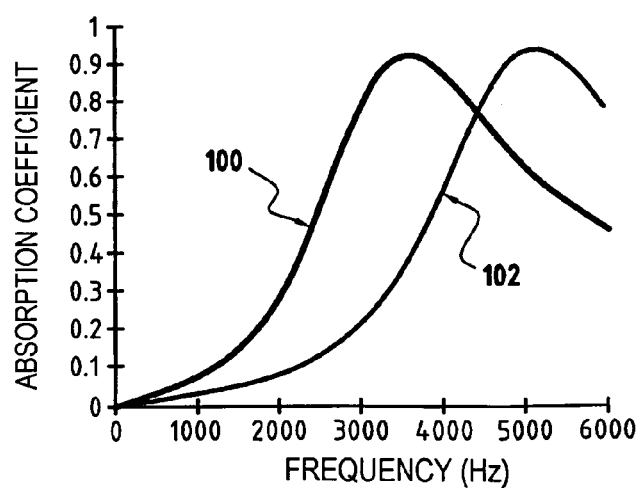
FIG. 3 is a graph plotting absorption coefficients for a soundproofing panel of the invention compared with a soundproofing panel made using beads that are not micro-perforated.

In the plot of absorption coefficients shown in FIG. 3, it can be seen that for given size, using micro-perforated beads (curve 100) enables the frequency setting to be significantly lower in terms of frequency than when using beads that are not micro-perforated (curve 102).

Another test has shown the sound energy dissipation performance obtained using beads that are micro-perforated in accordance with the invention in comparison with the performance of beads that are not micro-perforated. This comparative test was performed under the following conditions:

Sample 1
A porous wall having a perforation ratio of 22% with perforation orifices having a diameter of 1.5 mm and a thickness of 0.7 mm.
Hollow spherical ceramic beads with porous and micro-perforated walls and a diameter of 2 mm were assembled in bulk to a thickness of 28.5 mm.

Sample 2
A porous wall having a perforation ratio of 22% with perforation orifices having a diameter of 1.5 mm and a thickness of 0.7 mm.
Hollow spherical ceramic beads with porous and non-micro-perforated walls and a diameter of 2 mm were assembled in bulk to a thickness of 28.5 mm.

These two samples were subjected to sound excitation at a level of about 140.5 decibels (dB). The results of this test are shown in FIGS. 4 and 5 which plot respectively the sound-absorption coefficients and the normalized acoustic impedance for each of the two samples.

Figure 4:
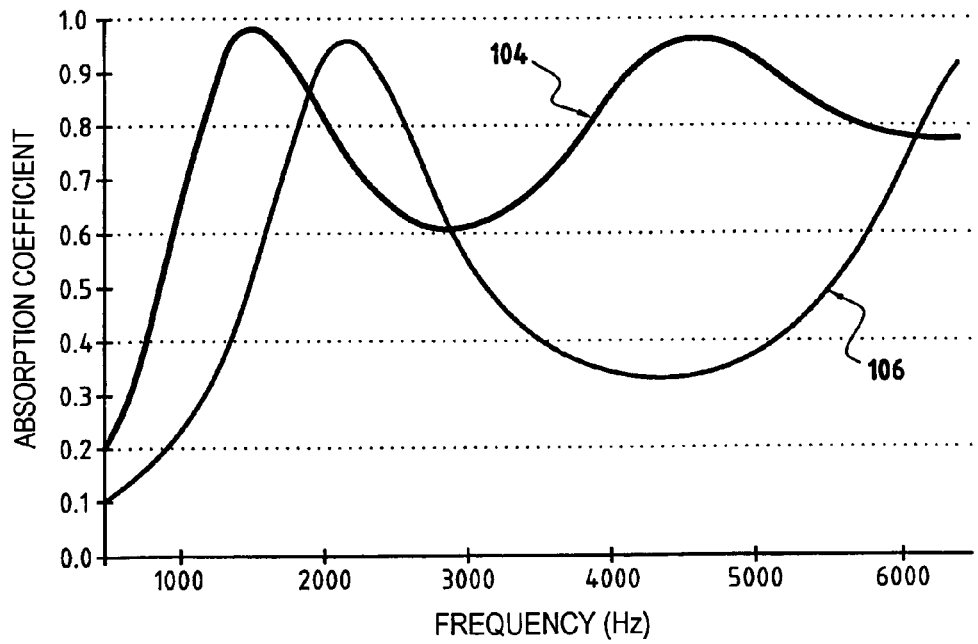
FIG. 4 is a graph plotting the sound-absorption coefficient for a sample of micro-perforated beads and for a sample of beads that are not micro-perforated.

In FIG. 4, curve 104 corresponds to the absorption coefficient of the first sample, while curve 106 corresponds to the absorption coefficient of the second sample.

Figure 5:
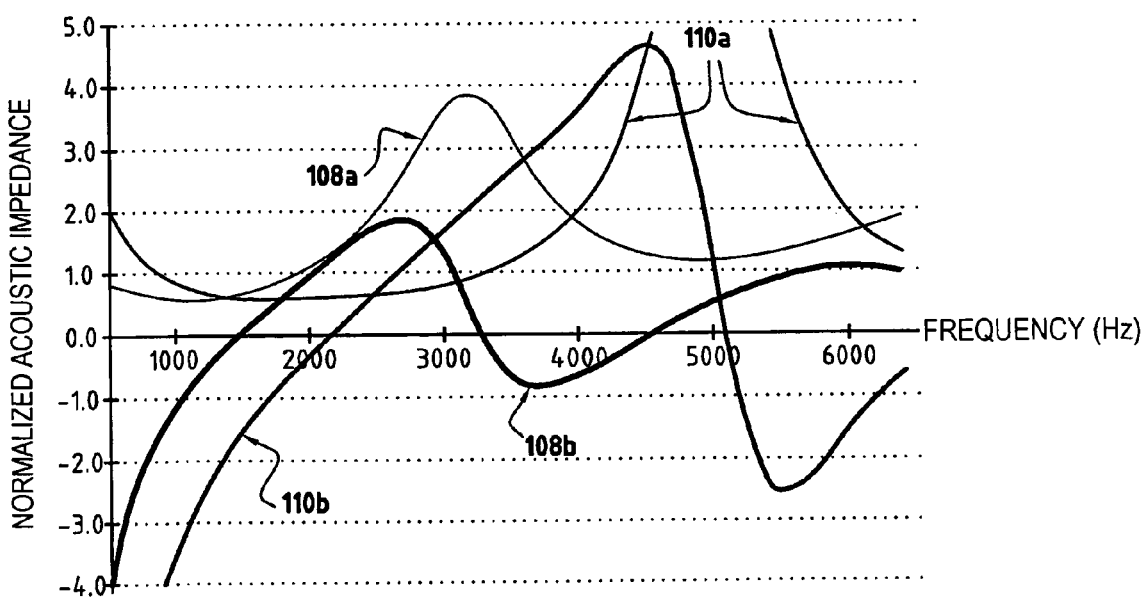
FIG. 5 is a graph plotting normalized acoustic impedance for a sample of beads that are micro-perforated and for a sample of beads that are not micro-perforated.

Similarly, in FIG. 5, curves 108a and 108b show the normalized acoustic impedance of the first sample, respectively in terms of resistance and reactance, while curves 110a and 110b show the normalized acoustic impedance of the second sample, respectively in terms of resistance and of reactance.

In FIG. 4, it can be seen that the characteristics of the dissipating layer with micro-perforated beads of the first sample (curve 104) enable an absorption coefficient to be obtained over a wide frequency band.

For this first sample, the absorption coefficient remains greater than 0.6 over the range 1000 hertz (Hz) to 6500 Hz. In comparison, the characteristics of the dissipating layer having non-micro-perforated beads in the second sample (curve 106) shows a narrower sound attenuation band, and also a lack of absorption at low frequencies.

The normalized impedance curves for resistance and reactance in FIG. 5 confirm that the frequency setting is broader for the first sample (micro-perforated beads) than for the second sample (beads that are not micro-perforated), and that sound energy dissipation is greater for the first sample.

There follows a description of the method of making a soundproofing panel of the invention, which description is given with reference again to FIG. 1.

The method consists essentially in making a core 4, in applying and securing one of the faces of the core to a porous wall 8, and in applying and securing the other face of the core to a solid wall 6.

In the invention, prior to applying and securing the faces of the core to the walls 6 and 8, provision is made to cut two nets 22 to the desired shape.

The lower net (reference 22a) is positioned and is secured to the partitions 12 of the core at a height H relative to the solid wall 6. The edges 24 of the lower net 22a are secured to the partitions 12, e.g. by welding.

The following step consists in placing a quantity of beads 20 on the lower net so as to define a desired thickness (I-H) for the dissipating layer 14, which thickness may be constant or varying.

An upper net (given reference 22b) is then put into position on the "bed" of beads 20 and while applying a certain amount of pressure (e.g. of the order of 0.1 mbar to 0.2 mbar) so as to avoid any movement of the beads in the dissipating layer.

The edges 24 of the upper net 22b are secured to the partitions 12 (e.g. by welding). These operations are repeated for each of the cells 10 in the core 4.

The core 4 as obtained in this way is subsequently placed between the walls 6 and 8 and is secured thereto.

The method of making the soundproofing panels shown in FIGS. 2A and 2B is identical.

The method of making a soundproofing panel as described above presents numerous advantages compared with a method that makes use of a binder for holding the beads in the dissipating layers.

The present method is much simpler to implement. No resin type binder is required, thereby avoiding problems with corrosion. The amount of tooling needed is also small.

This method thus makes it possible to make soundproofing panels with dissipating layers of varying thickness.

What is claimed is:

1. A soundproofing panel comprising:
   a solid wall;
   a porous wall;
   a core positioned between said solid wall and said porous wall and connected to both said solid wall and said porous wall, said core including partitions extending between said solid wall and said porous wall and forming a plurality of cells, each cell containing a plurality of sound energy dissipating layers constituted by hollow spherical beads in mutual contact; and
   a first net and a second net provided with each of the plurality of sound energy dissipating layers, the first and second nets are secured to the partitions,
   wherein said hollow spherical beads have walls that are porous and micro-perforated and said hollow spherical beads are held in position by the first and second nets, and
   wherein at least two of the plurality of sound energy dissipating layers formed in a single cell vary in thickness from each other.

2. A soundproofing panel according to claim 1, wherein said porous wall further includes perforations for increasing the viscothermal effect on the air passing therethrough.

3. A soundproofing panel according to claim 1, wherein the dissipating layers are constituted by beads of uniform diameter.

4. A soundproofing panel according to claim 1, wherein the dissipating layers are constituted by a mixture of beads having diameters varying in the range 1 mm to 3.5 mm.

5. A soundproofing panel according to claim 1, wherein the nets are of the same composition as the partitions onto which they are secured.

6. A soundproofing panel according to claim 1, wherein the micro-perforations in the walls of said hollow spherical beads include a surface dimension in the range of 200 μm to 400 μm.

7. A soundproofing panel according to claim 1, wherein the micro-perforations in the walls of said hollow spherical beads include a surface dimension that is greater than a dimension of the pores in the same walls by a factor of at least about 20.

8. A soundproofing panel according to claim 1, wherein the micro-perforations in the walls of said hollow spherical beads are substantially cylindrical having a diameter of about 200 μm.

9. A soundproofing panel according to claim 1, wherein the micro-perforations in the walls of said hollow spherical beads have a rectangular cross-section.

10. A soundproofing panel according to claim 9, wherein said rectangular cross-section has a width of about 200 μm and a length of about 500 μm.

11. An exhaust nozzle having a soundproofing panel according to claim 1.

12. A turbomachine having a soundproofing panel according to claim 1.

13. An airplane having a soundproofing panel according to claim 1.

14. A method of making a soundproofing panel comprising the steps of:
    forming a core comprising partitions that form cells;
    positioning a lower net in each cell of said core;
    securing said lower nets to said partitions;
    placing on said lower net a desired thickness of hollow spherical beads having porous and micro-perforated walls;
    positioning an upper net in each cell while applying a small amount of pressure against said beads;
    securing said upper nets to said partitions;
    securing one end of the partitions forming said core to a porous wall; and
    securing another end of the partitions forming said core to a solid wall,
    wherein the lower and upper nets form sound energy dissipating layers,
    wherein each cell includes a plurality of sound energy dissipating layers, and
    wherein at least two of the plurality of sound energy dissipating layers formed in a single cell vary in thickness from each other.

15. A method according to claim 14, wherein said porous wall further includes perforations to increase the viscothermal effect of the air passing therethrough.

16. A method according to claim 14, wherein said upper and lower nets are welded to said partitions, and said ends of the partitions forming said core are welded to said walls.

17. A method according to claim 14, wherein the micro-perforations in the walls of said hollow spherical beads include a surface dimension in the range of 200 μm to 400 μm.

18. A method according to claim 14, wherein the micro-perforations in the walls of said hollow spherical beads include a surface dimension that is greater than a dimension of the pores in the same walls by a factor of at least about 20.

* * * * *